United States Patent [19]

Hazenbroek

[11] Patent Number: 4,593,432
[45] Date of Patent: Jun. 10, 1986

[54] FILLETING APPARATUS

[75] Inventor: Jacobus E. Hazenbroek, Numansdorp, Netherlands

[73] Assignee: Systemate Holland B.V., Netherlands

[21] Appl. No.: 630,658

[22] Filed: Jul. 13, 1984

[30] Foreign Application Priority Data

Jul. 13, 1983 [NL] Netherlands .................. 8302494

[51] Int. Cl.⁴ .................. A22C 21/00; A22C 25/16
[52] U.S. Cl. .................................. 17/46; 17/11
[58] Field of Search .......................... 17/11, 46, 56

[56] References Cited

U.S. PATENT DOCUMENTS

| 1,639,976 | 8/1927 | Barry . | |
|---|---|---|---|
| 3,296,653 | 1/1967 | Segur | 17/11 |
| 3,531,825 | 10/1970 | Segur et al. | 17/11 |
| 3,629,903 | 12/1971 | Turner | 17/11 |
| 3,665,553 | 5/1972 | Colosky | 17/11 |
| 3,672,000 | 6/1972 | Martin et al. | 17/11 |
| 4,037,294 | 7/1977 | Cowie et al. | 17/56 |
| 4,216,565 | 8/1980 | Volk et al. | 17/1 G |
| 4,327,463 | 5/1982 | Martin | 17/11 |
| 4,377,884 | 3/1983 | Viscolosi | 17/11 |
| 4,385,419 | 5/1983 | Cantrell | 17/11 |
| 4,402,112 | 9/1983 | Gasbarro | 17/11 |
| 4,424,608 | 1/1984 | Martin | 17/11 |

FOREIGN PATENT DOCUMENTS 2110080 9/1972 Denmark .

OTHER PUBLICATIONS

Automatic Thigh DeBoner-Pritchard Sales Co. brochure, Model TB-1 Chicken/Fowl, TB-1T Turkey.

Primary Examiner—Willie G. Abercrombie
Attorney, Agent, or Firm—Thomas & Kennedy

[57] ABSTRACT

The filleting apparatus for removing fillets from poultry carcasses comprises a tabletop chain onto which at regular distances retaining means are provided which move the carcasses through a gate member so that the fillets are mechanically pushed off from the carcass.

24 Claims, 12 Drawing Figures

FIG. 9 ated already.

FILLETING APPARATUS

BACKGROUND OF THE INVENTION

This invention relates to a filleting apparatus for removing the fillets from previously eviscerated poultry carcasses of which the legs, the wings and the skin have been removed already.

Up to now filleting takes place by hand. The present invention tends to mechanize the filleting and to provide a filleting apparatus which enables at least the same, but preferably a better quality of filleting.

SUMMARY OF THE INVENTION

According to the invention this is achieved in that the apparatus comprises a frame in which a drivable conveyor is mounted, onto which at regular distances retaining means are provided which move the poultry through a gate member in such a way that the fillets are pushed off from the carcass.

The retaining means may comprise a plastic moulding piece which can be directly connected to a link of a tabletop chain or by a support member. It is preferred to connect a retaining means to every sixth link of the tabletop chain.

The moulding piece should have a smoothly progressing cross-sectional diameter which is adapted to the interior of the poultry carcass, and two recesses at its front to receive the wing joint bones of the poultry.

The support member may comprise a support plate which is connected by means of a triangular plate with a girder having a length of about five links, said girder being welded to the "central" link. The rear end of the girder may, in the horizontal runs of the tabletop chain, fit, into a cup provided on a link. If there is no support member, pins can be provided on the links to be received in a bore of the retaining means in the horizontal runs of the tabletop chain.

The gate member comprises e.g. a porch which is filled up with a cross plate in which a slotted plate is provided, which permits the keel bone and the ribs of the carcass to pass through, but stops the fillets. One or more reciprocating pushing means can be provided onto the porch to push the wing joint bones of the carcass to one another just in front of the slotted plate. In case onto every sixth link of the tabletop chain a cam is welded which is adapted to operate a feeler, the reciprocation of the pushing means can be operated by said feeler.

On the side of the gate member which is averted from the movable pushing means two horizontal angular profiles can be provided on the slotted plate, said profiles pressing the wing joint bones to one another even beyond the slotted plate.

In another embodiment of the invention the cross plate of the gate member, seen in the direction of motion of the conveyor, is at a rearward angle which is for instance 23° with respect to the vertical. In that event three pushing means can be provided on the cross plate, in which two lateral pushing means to push the wing joint bones of the carcass to one another and one central pushing means to roll off the upper muscle of the keel bone are moved simultaneously to the operative position by the controlling means and in which the lateral pushing means are returned before the central pushing means. The central pushing means comprises two extensions extending in longitudinal direction of the apparatus and a passage to permit the keel bone to pass through.

In order to be able to cut the fillets into halves a pre-porch can be provided upstream the gate member.

Finally downstream the gate member a carcass removing device can be provided to remove the carcasses from the remaining means.

BRIEF DESCRIPTION OF THE DRAWING

The invention will be elucidated herebelow on the basis of the drawing in which by way of example some embodiments of a filleting apparatus according to the invention are shown. In the drawing.

DETAILED DESCRIPTION

Figure 1:
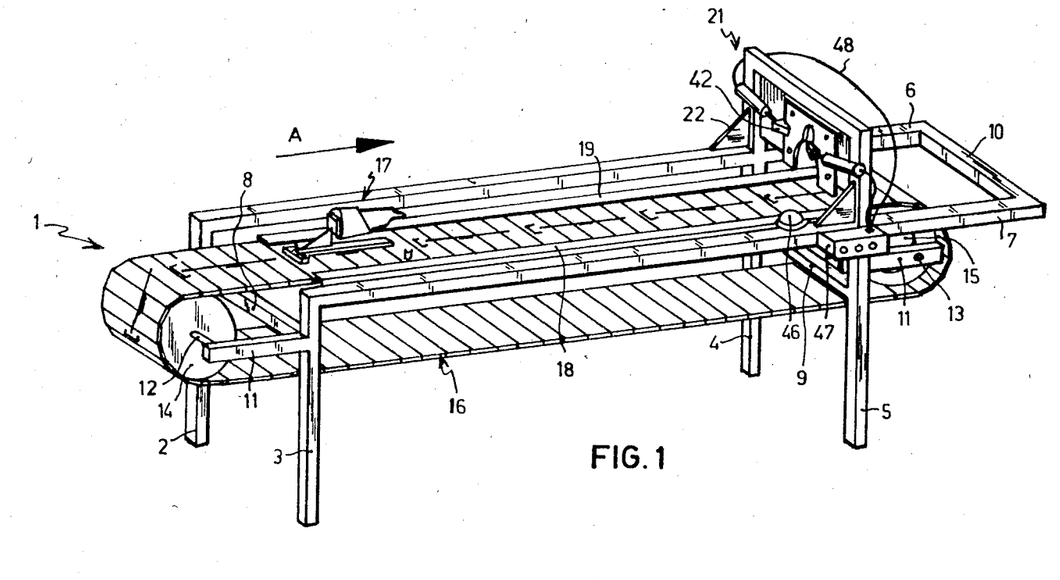
FIG. 1 is a perspective view of a basic embodiment of a complete filleting apparatus.

The filleting apparatus shown in FIG. 1 comprises a frame 1 with four legs 2-5, two longitudinal girders 6 and 7 and three cross bars 8-10. Arms 11 on the legs 2/3 and 4/5 support the shafts 12 and 13 for sprockets 14 and 15 of a tabletop chain 16. The shaft 13 can be driven by a (not represented) electromotor or hydro-motor and is also provided with known (not represented) means to bring and keep the tabletop chain under the right tension.

Retaining means 17 are provided on the tabletop chain 16 at regular distances e.g. at a length of six links of the tabletop chain, said retaining means being further elucidated by FIGS. 2 and 10-12. Along the upper run of the tabletop chain on both sides an angular strip 18, 19 is provided to guide the tabletop chain and/or prevent the the links of the tabletop chain from tilting about a horizontal axis.

Figure 3:
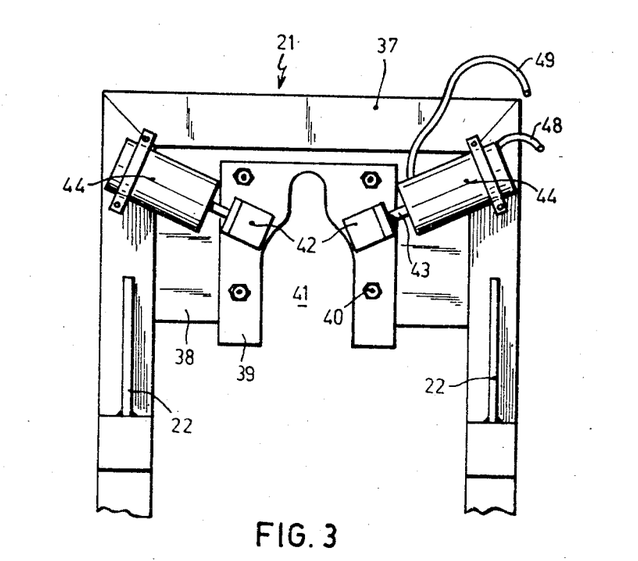
FIG. 3 is a rear view of the gate member of the apparatus in FIG. 1.
Figure 4:
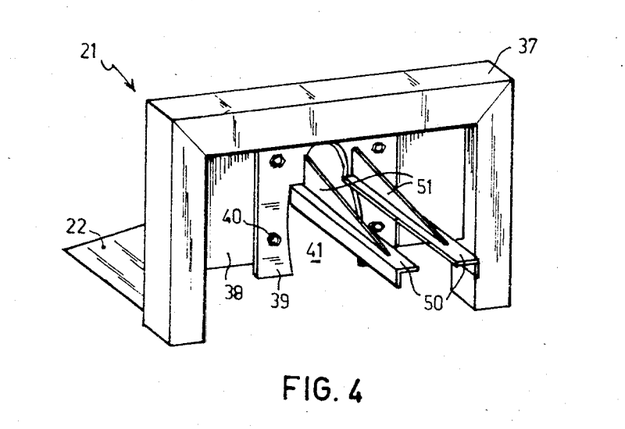
FIG. 4 is a perspective front view of the gate member in 3.

Near the legs 4 and 5 and the cross bar 9 a gate member 21 is mounted on the frame 1, which will be further elucidated from FIGS. 3 and 4. Said gate member is connected with the frame by means of triangular plates 22.

Figure 2:
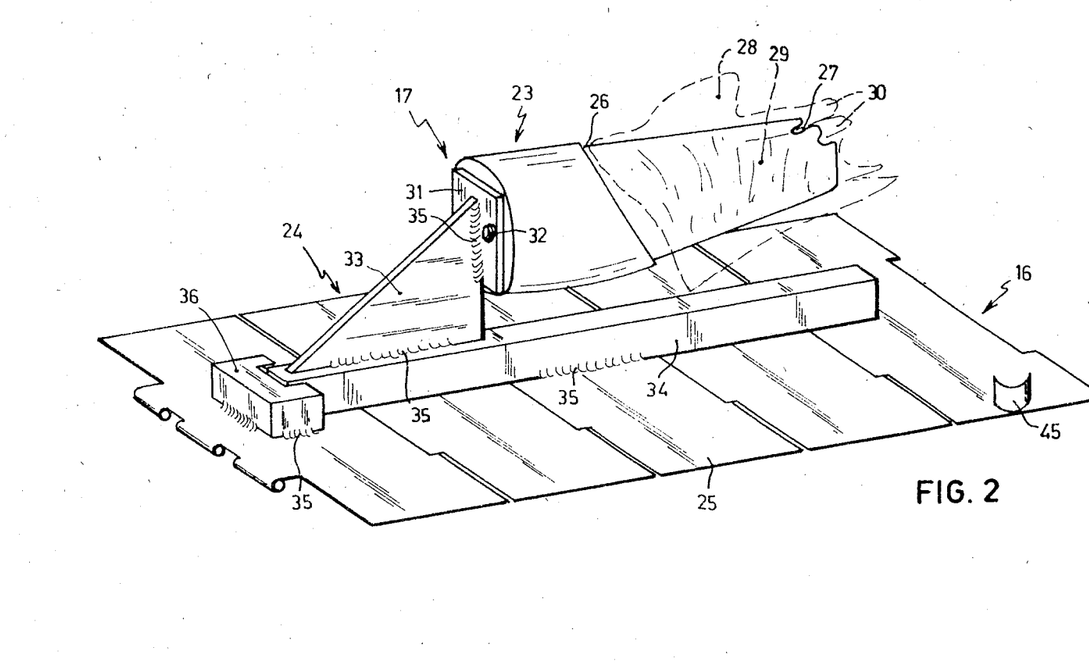
FIG. 2 is a perspective view in a larger scale of a number of links with thereon a first embodiment of a retaining means.

FIG. 2 gives details of a first embodiment of the retaining means 17 comprising a moulding piece 23 which is connected to a link 25 of the tabletop chain 16 by means of a support member 24.

The moulding piece 23 has a smoothly progressing cross-sectional diameter which is adapted to the interior of the poultry carcass and preferably is made from plastic. At about half its length an obliquely downwardly running breast 26 is provided having a thickness which is approximately equal to the thickness of the carcass. More to the front the moulding piece is tapered to two recesses 27 for receiving the wing joint bones 30 of the poultry. Some important parts of the poultry are indicated in dotted lines: a keel bone 28, a number of ribs 29 and both wing joint bones 30.

The support member 24 (FIG. 2) comprises a support plate 31 being placed transversely to the direction of motion of the tabletop chain and having holes for passing through securing screws 32 which can be screwed in the moulding piece 23. The support plate 31 is connected by a vertical triangular plate 33 to a girder 34 having a length of about five links 25. The girder is welded onto the link which is nearest to the support plate 31. The various welds are indicated by reference numerals 35 in the drawing.

When the retaining means 17 are running around the sprockets 14 and 15, the front and rear parts of the girders 34 come free from the surface of the links 25 adjacent to the "central" link. In the horizontal runs of the tabletop chain 16 the rear parts of the girders 34 fit into cups 36 having a U-like shape in upper view, which are mounted e.g. by welds 35 on the respective links. Said cups 36 promote the centering of the retaining means 17 and provide a better load distribution at the moment of pushing off the fillets by the gate member 21.

So, although the moulding piece 23 and the support member 24 are removably interconnected it is, in general, hardly ever necessary to adapt the moulding pieces 23 to the dimensions of the poultry since the dimensions of the carcasses thereof appear to deviate from one another much less than would be assumed in first instance.

FIGS. 3 and 4 are details of the gate member 21 comprising a porch 37 which is reinforced by triangular plates 22. Within the porch 37 a slotted plate 39 is fastened to a cross plate 38. This fastening can be released by screw joints 40, so that the dimensions of the free passing opening 41 of the slotted plate can be eventually adapted to the kind of poultry to be operated, one and another in the same way as could be doe with the moulding pieces 23.

In FIG. 3 two lateral pushing means 42 can be seen at either side of the passage opening 41, which are mounted to the end of a piston rod 43 which can be reciprocated in a cylinder 44. The centerlines of the cylinders 44 are directed obliquely downwardly to one another in such a way that the lateral pushing means 42 push the wing joint bones 30 (FIG. 2) to one another just before the poultry enters the passage opening 41.

The pushing means 42 are controlled by vertically directed cams 45 (FIG. 2) which are provided on every sixth link 25 alonng one of the outer edges thereof and which contact during operation a feeler 46 provided on the longitudinal girder 7 (FIG. 1).

In a control box 47 valves are operated then which alternatingly supply compressed fluidum, such as air to the hoses 48 and 49 to reciprocate the piston rods 43.

In FIG. 1 it can be seen that the lateral pushing means 42 in upper view have a triangular shape. Otherwise it is also possible to use only one pushing means, which can be reciprocated in the vertical symmetrical plane of the passage opening 41.

The wing joint bones 30 should not spring back after passage of the slotted plate 39, since this could result in rupture of one or more ribs 29 of the poultry and then the fillets will not be pushed off in the right way. Therefore according to FIG. 4 on the side of the gate member 21 which is averted from the pushing means 42 two horizontal angular profiles 50 are provided on the slotted plate 39. Said profiles are also rigidly connected with the slotted plate 39 by triangular plates 51. Of course both angular profiles 50 and the triangular plates 51 can be made from one piece.

The above described apparatus works as follows:

Previously eviscerated poultry is put on the retaining means 17 near the cross bar 8 during the forward movement of the upper run of the tabletop chain 16 in the direction of the arrow A in FIG. 1. When the poultry has passed the gate member 21 the carcass is still on the moulding piece 23 but the fillets hang over the support member 24 whereas they can be connected yet with remainder of meat. The fillets can be easily removed then from the carcass and can be rolled and packed properly after inspection. The carcasses fall between the cross bars 9 and 10 under the influence of gravity and the tilting movement of the retaining means 17 into a (not represented) garbage box.

For completeness' sake the whole apparatus between the cross bars 8 and 9 can be covered and can be provided with (not represented) safety buttons to stop the apparatus if something would go wrong.

A second embodiment of the invention will be elucidated now from FIGS. 5 through 9.

Figure 5:
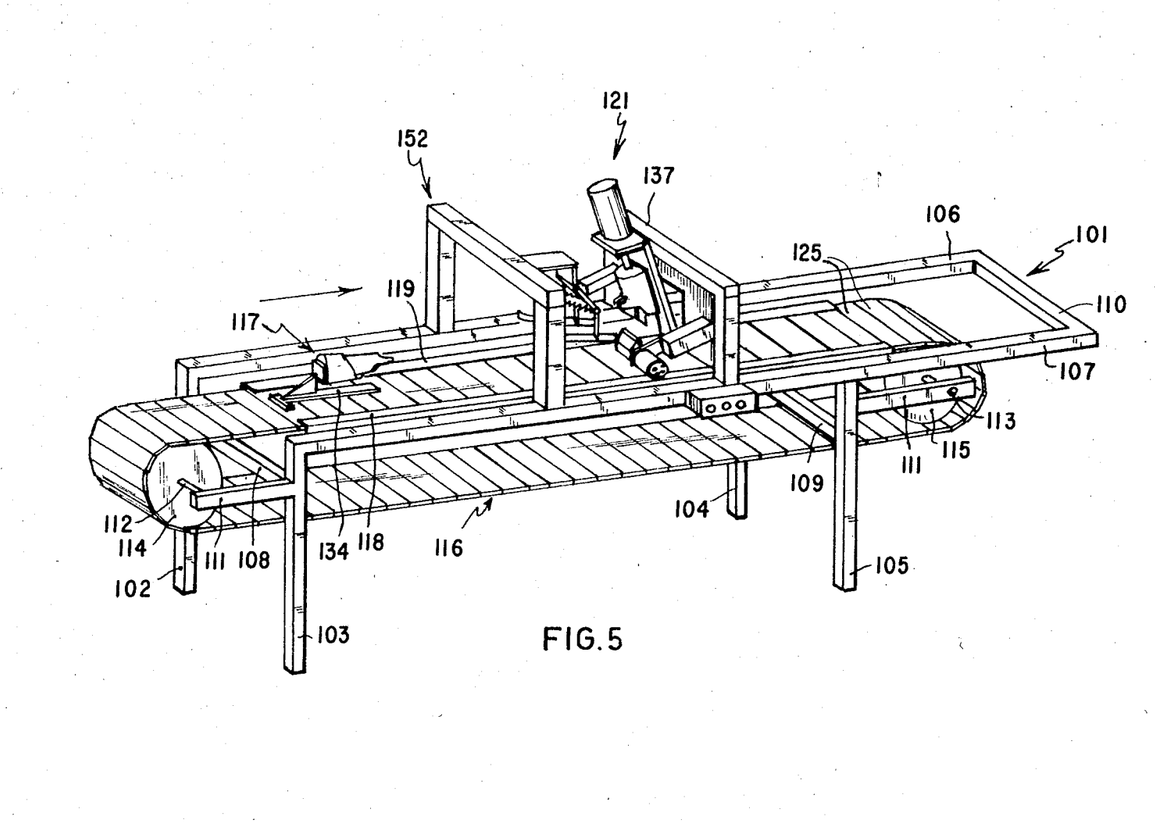
FIG. 5 is a perspective view of a second embodiment of a complete filleting apparatus.

The filleting apparatus represented in FIG. 5 also comprises a frame 101 with four legs 102–105, two longitudinal girders 106 and 107 and three cross bars 108–110.

Arms 111 on the legs 102/103 and 102/103 support the shafts 112 and 113 for sprockets 114 and 115 of a tabletop chain 116. The shaft 113 can be driven by a (not represented) electromotor or hydromotor and is also provided with known (not represented) means to bring and keep the tabletop chain under the right tension.

Figures 8, 10, 11:
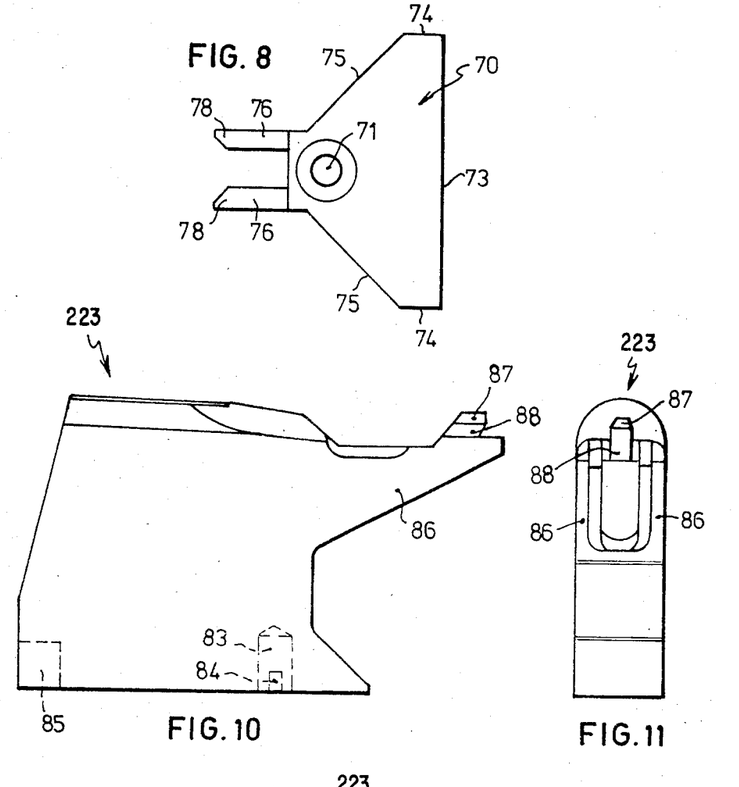
FIG. 8 is a view in the direction of arrow VIII of the central pushing means in FIG. 6
FIGS. 10 and 11 are side elevational and front respectively of the prefered embodiment of the retaining means.
Figure 12:
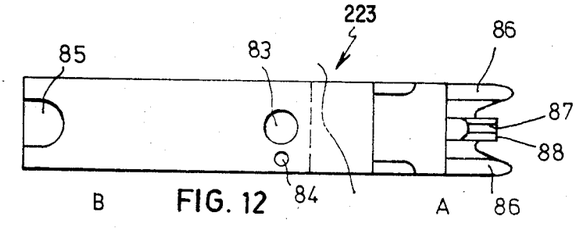
FIG. 12 is a split view of the bottom and to surfaces of the retaining means of FIGS. 10 and 11, with the portion to the left of the dashed line designated as "B" illustrating the bottom surface, and the portion to the right of the dashed line designated as "A" illustrating the top surface.

Retaining means 117 are provided on the tabletop chain 116 at regular distances e.g. at a length of a six-links of the tabletop chain, said retaining means being further elucidated from FIGS. 10–12. Along the upper run of the tabletop chain on both side an angular strip 118, 119 is provided to guide the links and/or to prevent the links of the tabletop chain from tilting about a horizontal axis.

Figure 6:
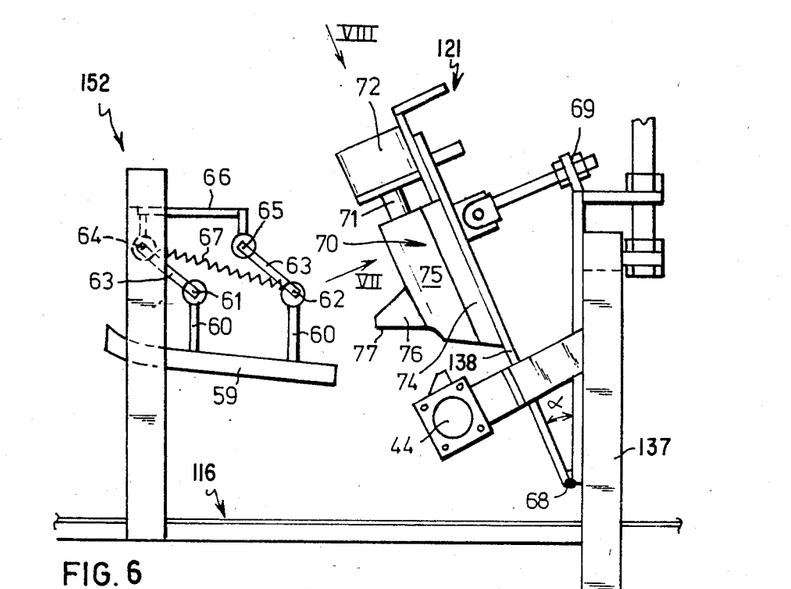
FIG. 6 is an elevational view in a larger scale of the pre-porch and the gate member of the apparatus in FIG. 5.

In the direction of movement of the upper run of the tabletop chain, i.e. in FIGS. 5, 6 and 10 from the left to the right, on the frame 101 are mounted successively; a pre-porch 152, and a gate member 121. The pre-porch and the gate member, which is very important for the present invention, will be elucidated more in detail from FIGS. 6–8.

When the retaining means 117 are running around the sprockets 114 and 115, the front and rear parts of the girders 134 come free from the surface of the links 125 adjacent to the "central" link. In the horizontal runs of the tabletop chain 116 the rear parts of the girders 135 can fit, just like in FIG. 1, into cups having a U-like shape in upper view, which are mounted on the respective links. Said cups promote the centering of the retaining means 117 and provide a more favourable distribution of load at the moment of pushing off the fillets into the gate member 121.

It remains possible, that the person who has to put the carcasses in the right position onto the remaining means, does not do his work correctly and puts a carcass obliquely onto the retaining means. In these events the so-called pre-porch 152 becomes effective, which is arranged just in front of the gate member 121 which has to push off the fillets from the carcass.

The pre-porch 152, which can be seen more in detail in FIG. 6, supports two slides 59, which diverge downwardly with respect to one another, of which slides the rearwardly directed end, which engages the carcasses first, is bent slightly upwardly. On the side of each slide 59 which is averted from the carcasses to be adjusted, two rods 60 are welded which connect the slide rotatably about shafts 61, 62 with the pivotal ends of two pivot plates 63, which on their turn are connected rotatably about their shafts 64 and 65 with the preporch 52 and a horizontal arm 66 thereof, respectively. The system of pivot plates 63 and shafts 61/62 and 64/65 is designed in such a way that there is a parallelogram hinge, the slides 59 of which always remain parallel to themselves. By connecting the shafts 62 and 64 by a draw-spring 67, the slides 59 are under a sufficient downward tension to bring incorrectly placed carcasses, if any, in the right position.

The pre-porch 152 can also be embodied as a device to cut the fillets into halves. The gate member 121 of the embodiment of FIGS. 5-8 is embodied very differently from the embodiment of FIGS. 1, 3 and 4. In the way represented in FIGS. 5 and 6 the gate member 121 comprises a porch 137 which is welded to the frame 101. The porch 137 supports a cross plate 138 which, seen in the direction of movement of the conveyor is at a rearward angle α, said angle α preferably being 23°. In FIG. 6 it is shown that the cross plate 138 at its lower part is connected with the porch 137 by a shaft 68 and at its upper part by a screw joint 69, so that it may be suggested that there is question of an adjustable angle α. As will be explained herebelow this is, however, not the case and the represented embodiment has to be considered as a prototype embodiment.

Figure 7:
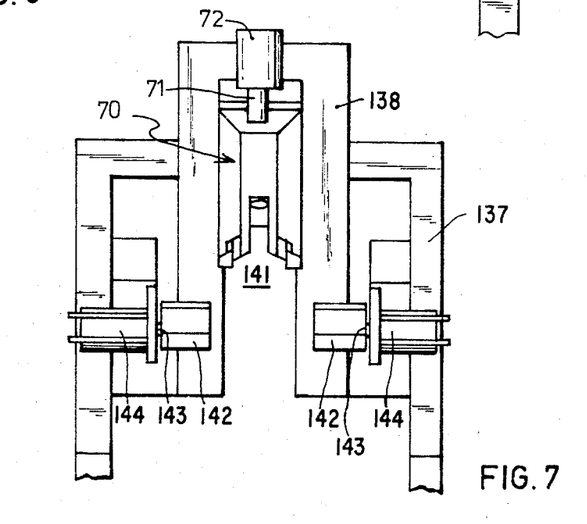
FIG. 7 is a view in the direction of arrow VII of the cross plate of the gate member in FIG. 6 with two lateral pushing means and a central pushing means.

In FIG. 7 it is shown that the cross plate 138 has a passage opening 141, the size of which is determined by the circumference of the carcasses to be deboned.

At either side of the passage opening 141 two lateral pushing means 142 can be seen, which are mounted to the end of a piston rod 143 which can be reciprocated in a cylinder 144. The centerlines of the cylinders 144 are directed to one another so that the lateral pushing means 142 press the wing joint bones to one another just before the carcass enters the passage opening 141.

Also a central pushing means 70 is provided now onto the end of a piston rod 71 which can be reciprocated in a cylinder 72. Details of the central pushing means will be elucidated from FIG. 8. It is mentioned here already, that the central pushing means serves to roll off the upper muscle of the keel bone from the carcass. Since this muscle lies somewhat rearwardly with respect to the wing joint bones, it is a characterizing feature of the operation of the apparatus that all three pushing means 142 and 70 are moved almost simultaneously to the operative position by (not represented) control means, indeed, but that the lateral pushing means 42 are returned obviously sooner than the central pushing means 70.

In FIGS. 6 and 8 is shown that the central pushing means 70 has a rear wall 73 which in mounted position of the central pushing means is parallel to the cross plate 138 of the gate member 121. Two narrow side walls 74 are arranged perpendicularly to said rear wall, said walls merging into converging wall parts 75 which merge into two protrusions 76 extending in longitudinal direction of the apparatus.

These protrusions 76 have a lower surface 77 (FIG. 6) which is parallel to the surface of the tabletop chain 116, and a pointed front part 78 (FIG. 8) which is adapted to engage the carcass precisely below the upper muscle of the keel bone. The feature that the lower surface 77 is parallel to the surface of the tabletop chain 116 means that the lower surface 77 should also be at an angle α with respect to the rear wall 73 of the central pushing means. This is the very reason why the earlier described angle α is not an adjustable angle.

When a retaining means 117 is moved through the gate member 121, the fillets are properly pushed off or rolled onto and along the triangular plate 133 of the retaining means 117 and can be put in a box by a person in the agreed way. The retaining means 117 is returned through the lower run of the conveyor to the place at the left side of FIG. 5 in order to be re-loaded with a carcass.

In the filleting apparatus shown in FIG. 9 can be seen the below listed items which also appear in FIGS. 1 and 5: two legs 203 and 205, a longitudinal girder 207, shafts 12 and 13 for sprockets 14 and 15 of a tabletop chain 216, retaining means 217, a gate member 221 with a porch 37 and a cross plate 38 which again is at a rearward angle of about 23°, a lateral pushing means 242, and a central pushing means 270 with belonging cylinders 272. The retaining means will further be elucidated from FIGS. 10-12.

Figure 9:
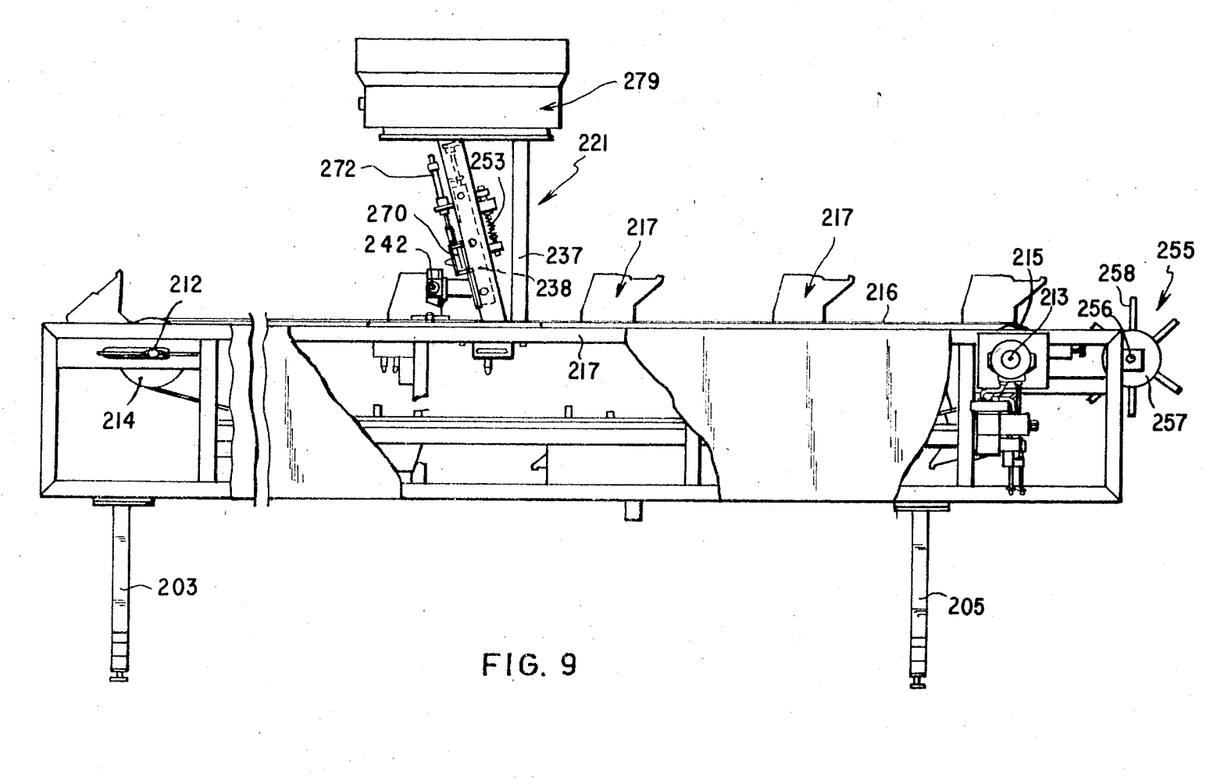
FIG. 9 is an elevational view of the prefered embodiment of the filleting apparatus.

Major differences between FIG. 9 and the earlier described embodiments of FIGS. 1 and 5 are: A The slotted plate 39 (FIG. 3) is supported in a resilient way to adapt the apparatus to operation in a wider range of poultry dimensions. This resilient suspensions is effected by a spring structure 253 at the rear side of the cross plate of FIG. 9. B At the end of the processing path, thus at the right hand end of FIG. 9, a device 255 has been mounted to remove the carcasses from the retaining means. This device comprises a shaft 256 which supports a drum 257 having around its periphery a number of rubber flaps 258. The number of revolutions of the shaft 256 preferably is such that the rotational velocity at the extremities of the flaps 258 is slightly greater than the velocity of the retaining means 217. C The control valves for the driving of the table top chain 216, the pushing means 242 and 270, and the devices 255 for removing the carcasses are housed in a casing 279 on top of the gate member 221.

The molding piece 223 of the retaining means 217 shown in FIGS. 10-12 is designed to be directly connected to a link of the tabletop chain 16, 116 or 216 of an apparatus as shown in either FIG. 1 or 5 or 9. The lower surface (FIG. 12B) is provided with two apertures: a bigger aperture 83 to accommodate a (not shown) bushing having internal screw thread so that the retaining means can be connected to a link which is provided with a hole at the correct position, and a smaller aperture 84 to accomodate a (not shown) pin extending from the link to avoid rotation of the retaining means around an axis perpendicular to the link then they more around the sprockets.

The same result could obviously also re reached by providing two bushings of medium size. At the rearward end there is a demi-circular aperture 85 which is designed to accomodate a pin which is welded to a subsequent link. This arrangement has the same purpose as the cups 36 of FIGS. 1 and 2:

to promote the centering of the retaining means and to promote a better load distribution at the moment of pushing off the fillets by the gate member.

The upper part of the retaining means shown in FIGS. 10-12 is adapted to the interior of the poultry carcass and has a somewhat anvillike shape, be it that the forwardly directed protrusions 86 in fact consists of two parallel triangular mould parts (see FIG. 12A).

An upright cam 87 having a slanting front surface 88 extends between both parallel triangular mould parts. These slanting surfaces 88 are adapted to receive the wing joint bones 30 (FIG. 2) if they are pushed to one another by the lateral pushing means 142 (FIG. 3 and 7).

It is remarked that the just described embodiment merely illustrates the basic idea of the invention in a preferred form. Many modifications, additions and deletions may, of course, be made thereto without departure from the spirit and scope there of as set forth in the following claims.

I claim:

1. Filleting apparatus for removing the fillets from previously eviscerated poultry carcasses of which the legs, wings and the skin have been removed already, said apparatus comprising a drivable conveyor mounted on and movable about said frame, a plurality of carcass retaing means mounted on said conveyor at spaced intervals and movable along a path about said frame, each said retaining means including a carcass moulding portion that is sized and shaped to approximately fit the previously eviscerated body cavity of a poultry carcass so that the body cavity of a poultry carcass can be mounted on and carried along the path by each retaining means with the moulding portion maintaining the shape of the body cavity, a gate member mounted along the path of said retaining means and including a passage therethrough the corresponds to the profile of the skeletal structure of the poultry carcasses, whereby when a poultry carcass is carried by a retaining means through the passage of the gate member the fillets are separated from the carcass.

2. Apparatus as in claim 1, characterized in the the carcass moulding portion of each said retaining means comprises a plastic moulding piece.

3. Apparatus as in claim 2 wherein said conveyor includes a table top chain with a series of adjacent links, and each retaining means is connected to a link.

4. Apparatus according to claim 2 wherein a retaining means is connected to every sixth link of the tabletop chain.

5. Apparatus as in claim 2 wherein the carcass moulding portion of each said retaining means has a smoothly progressing cross-sectional diameter which corresponds to the shape of the interior of the poultry carcass, and comprises two recesses to receive the wing joint bones of the poultry carcass.

6. Apparatus as in claim 3, wherein said retaining means each comprises a support plate connected through a triangular plate with a girder having a length of about five links of said tabletop chain, said girder being welded intermediate its ends to a link.

7. Apparatus as in claim 6 wherein a cup-shaped support is mounted to a link of the tabletop chain adjacent one end of the girder of each retaining means and the girder end fits into said cup shaped support.

8. Apparatus as i claim 3 wherein each said retaining means is connected to a link by a screw joint, each said retaining means includes an aperture displaced from said screw joint, and a pin is mounted on one of the links to be received in said aperture of the retaining means during the horizontal runs of the tabletop chain.

9. Apparatus as in claim 1 wherein each of said retaining means has two forwardly directed protrusions, an upright cam having two slanting surfaces extending between these protrusions to receive the wing joint bones of a poultry carcass when the wing joint bones are pushed toward one another.

10. Apparatus as in claim 1 wherein each said gate member comprises a porch which is filled up with a cross plate in which a slotted plate is provided, which permits the breast bone (28) and the ribs (29) of a poultry carcass to pass through, but stops the fillets of the poultry carcass.

11. Apparatus as in claim 10 and further including means for resiliently supporting said slotted plate.

12. Apparatus as in claim 10 wherein said porch includes at least one reciprocating pushing means for pushing is the wing joint bones of the poultry carcass toward one another as the carcasses move in front of the slotted plate.

13. Apparatus as in claim 12 characterized in that on every sixth link a cam is mounted in a position to operate a feeler to control the reciprocation of the pushing means.

14. Apparatus as in claim 13 characterized in that on the side of the gate member which is averted from the reciprocating pushing means two horizontal angular profiles are provided on the slotted plate, said profiles pushing the wing joint bones toward one another beyond the slotted plate.

15. Apparatus as in claim 10 wherein said cross plate of the gate member is sloped at a rearward angle of preferably about 23° from the direction of motion of the conveyor with respect to the vertical.

16. Apparatus as in claim 14, characterized in that on the gate member three pushing means are provided in which two lateral pushing means push the wing joint bones of the carcass toward one another and one center pushing means rolls off the upper muscle of the breast bone, and means for moving said push means simultaneously to their respective operative positions and for returning the lateral push means before returning the central pushing means.

17. Apparatus as in claim 16, characterized in that the central pushing means comprises two protrusions extending in longitudinal direction of the conveyor, and a passage formed therein to permit the keel bone of a carcass to pass through.

18. Apparatus as in claim 1 and further including at a position along the path upstream said gate member a pre-porch comprising means to cut the fillet of a poultry carcass into halves.

19. Apparatus as in claim 1 and further including at a position along the path downstream the gate member a carcass removing device.

20. Apparatus as in claim 19 and where said carcass removing device comprises a drum including rubber flaps, means for rotating said drum so that the rotation velocity of the extremities of the rubber flaps are higher than the velocity of the retaining means.

21. Apparatus for filleting previously eviscerated poultry carcasses of which at least the legs, wings and skin have been removed, said apparatus comprising a conveyor, a plurality of carcass retaining means carried by said conveyor at intervals spaced along the conveyor through a processing path, and said carcass retaining means including a carcass moulding portion sized and shaped to fit in and mould the visceral cavity of a poultry carcass, a gate positioned along the processing path of said conveyor, said gate defining a passage therethrough that corresponds to the profile of the skeletal structure of the poultry carcasses moved through said gate by said conveyor with the passage of the gate being smaller than the space occupied by the profile of the carcass with the meat attached to the skeletal structure of the carcass, whereby when a poultry carcass is moved on a carcass retaining means along the processing path through the gate, the meat of the carcass is stripped from the skeletal structure of the carcass.

22. The apparatus of claim 21 and further including means responsive to the movement of said conveyor for pushing the wing sockets of the poultry carcass toward each other as each poultry carcass approaches said gate.

23. The apparatus of Claim 21 and further including carcass removing means positioned adjacent the processing path for removing the carcass from said carcass retaining means.

24. A method of filleting previously eviscerated poultry carcasses comprising mounting a plurality of poultry carcasses on a series of carcass retaining means which correspond in size and shape to the cavity of the skeletal structure of the poultry carcass so as to mould the visceral cavity of the poultry carcass to a predetermined size, moving the carcass retaining means each with a poultry carcass mounted thereon through a gate that defines a passage therethrough that corresponds to the profile of the skeletal structure of the poultry carcasses moved throuh the gate, and as each poultry carcass passes through the gate, engaging and stripping with the gate the meat from the skeletal structure of the poultry carcass.

* * * * *